United States Patent [19]
Bailey

[11] Patent Number: 5,207,529
[45] Date of Patent: May 4, 1993

[54] FASTENING DEVICE

[75] Inventor: Norman R. Bailey, Lockport, N.Y.

[73] Assignee: General Motors Corporation, Detroit, Mich.

[21] Appl. No.: 906,188

[22] Filed: Jun. 29, 1992

[51] Int. Cl.5 .............................................. B25G 3/28
[52] U.S. Cl. .................................... 403/354; 403/410
[58] Field of Search ................ 24/453, 662; 403/354, 403/410

[56] References Cited

U.S. PATENT DOCUMENTS

| | | |
|---|---|---|
| 1,173,374 | 2/1916 | Leimer ............................ 403/354 X |
| 3,378,329 | 4/1968 | Bieseker . |
| 3,611,510 | 10/1971 | Bennett et al. ...................... 403/354 |
| 5,038,978 | 8/1991 | Kolten et al. . |

Primary Examiner—Andrew V. Kundrat
Attorney, Agent, or Firm—Patrick M. Griffin

[57] ABSTRACT

A fastener assembly for securing first and second members (12, 14) to one another includes a cylindrical body (16) to be received and secured within a sheath (40). The cylindrical body includes a pair of longitudinal recesses (30, 32) extending in its external surface, and a spherical member (24) extending from the end thereof. The sheath includes a cylindrical bore (42) for receiving the body with a pair of ribs (44, 46) extending into the bore for alignment with the recesses. The spherical member extends from the sheath and is slotted (26) for retention against an outer surface (14a) of the second member. The ribs taper from an enlarged end (58) to be frictionally secured within the recesses for axial retention and anti-rotation.

3 Claims, 2 Drawing Sheets

FASTENING DEVICE

TECHNICAL FIELD

The invention relates to a fastener for securing two members along their longitudinal axes, and more particularly, a fastener for securing the members without requiring additional tools or separate components.

BACKGROUND OF THE INVENTION

Many assemblies for fastening two members to one another include a plurality of components to effect the securing. There has been developed fasteners which require the insertion of one member within the other to obtain the necessary retention. One example is disclosed in Kolten et al U.S. Pat. No. 5,038,978, issued Aug. 13, 1991. The patent discloses a garment hanger which comprises a body of resilient material having a spherical member extending therefrom with a slot therein for providing resiliency. This sphere may be inserted into a complimentary spherical housing by compression of the sphere halves against one another during insertion and expansion thereof upon insertion within the spherical cavity.

Bieseker U.S. Pat. No. 3,378,329, issued Apr. 16, 1968 discloses a plastic fastener for securing a rod to a door. The ends of the rod include planar flanges extending therefrom. The door includes a separate fastener which is inserted within an aperture in the door having a shank portion inserted through the aperture with a head portion extending from the other side of the door. The fastener includes opposing grooves therein for receiving the planar flanges of the rod. Upon insertion, the rod is rotated 90° to misalign the flanges with the grooves preventing removal thereof.

SUMMARY OF THE INVENTION

The invention is a fastener assembly for securing a first member to a second member. The assembly comprises a cylindrical body adapted to be fixedly secured to the first member having a longitudinal length extending between first and second ends and having an external surface. The body includes a recess extending longitudinally within the external surface from the second end toward the first end. The second end includes a spherical member extending longitudinally outwardly therefrom having a slot therethrough forming two portions connected to the second end. Also included is a sheath adapted to be fixedly secured to the second member. The sheath includes a cylindrical bore formed longitudinally therethrough with a longitudinal rib extending therein for receiving the cylindrical body within the bore with the recess aligned with the rib to allow orientation between the body and sheath and with the resilient spherical member extending from the sheath to prevent axial separation therebetween.

The invention also includes the longitudinal rib tapering from an enlarged first end to a second end for tightening against the recess upon insertion of the cylindrical body within the cylindrical sheath. The cylindrical body includes a pair of diametrically opposed recesses. The cylindrical sheath includes a pair of diametrically opposed ribs aligned with the recesses. A first of the aligned recesses and ribs have an arcuate width greater than a second of the aligned recesses and ribs for assuring proper orientation of the cylindrical body within the sheath.

FIGURES IN THE DRAWING

Advantages of the present invention will be readily appreciated as the same becomes better understood by reference to the following detailed description when considered in connection with the accompanying drawings wherein.

DESCRIPTION OF THE PREFERRED EMBODIMENT

Figure 1:
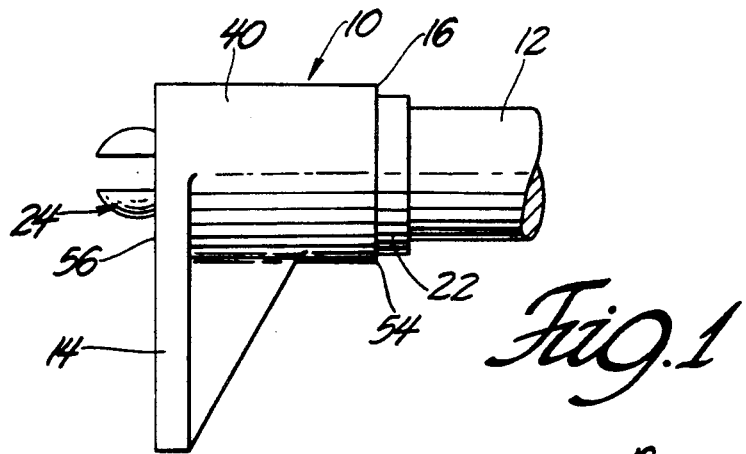
FIG. 1 is an elevational view of a fastener assembly of the present invention for connecting first and second members.
Figure 2:
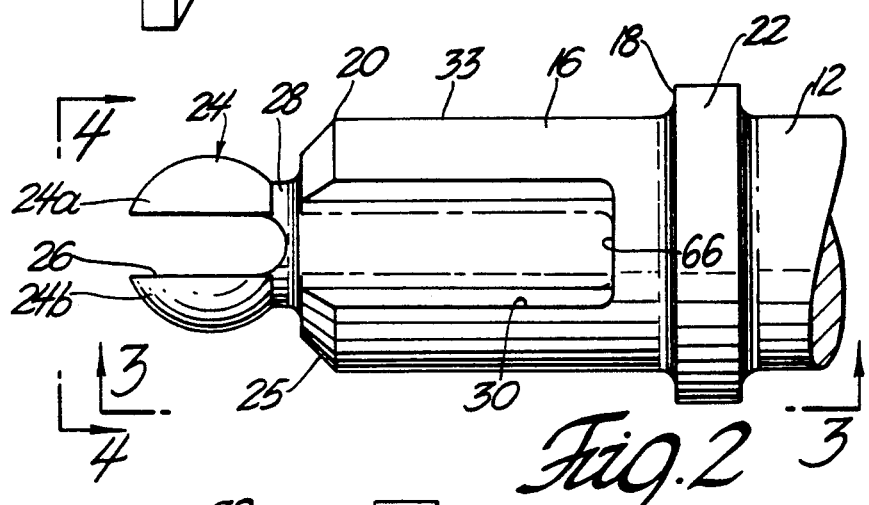
FIG. 2 is an enlarged side view of a first member having a cylindrical body.
Figure 3:
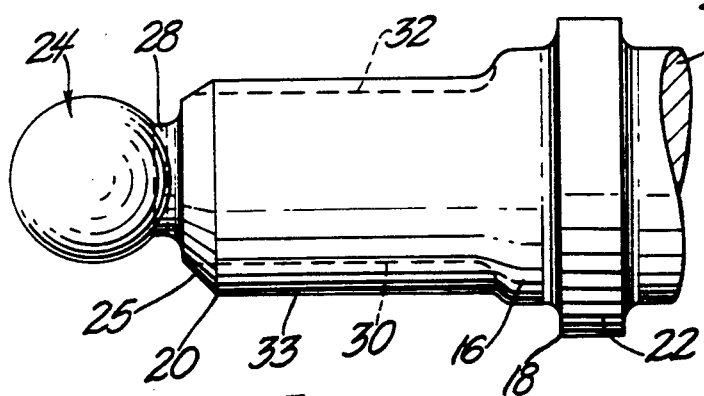
FIG. 3 is an enlarged side view looking in the direction of lines 3—3 of FIG. 2.
Figure 4:
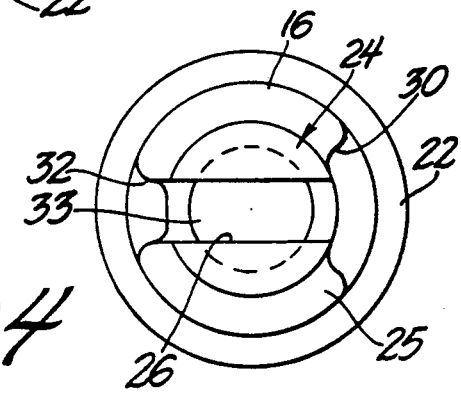
FIG. 4 is an end view taken along lines 4—4 of FIG. 2.
Figure 5:
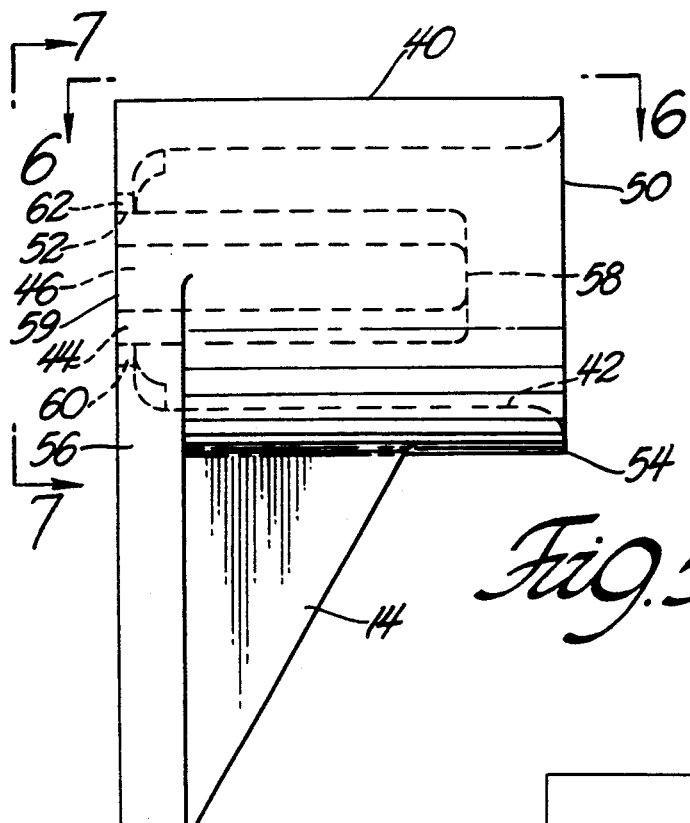
FIG. 5 is an enlarged side view of a cylindrical sheath of a second member.
Figure 6:
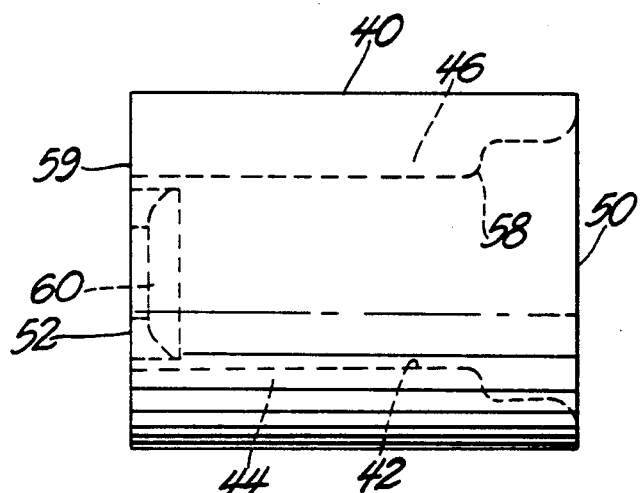
FIG. 6 is an enlarged side view looking in the direction of lines 6—6 or FIG. 5.

A fastener assembly 10 for securing a first member 12 to a second member 14 is generally illustrated in an assembled state in FIG. 1. The fastener assembly 10 requires no additional assembly tools or separate fasteners. The fastener assembly 10 is self aligning, capable of blind assembly and hand assembly, and is always maintained under pressure to eliminate rotary motion while resisting axial separation.

A cylindrical body 16 is adapted to be fixedly secured to the first member 12. The cylindrical body 16 has a longitudinal length extending between a first end 18 and a second end 20. A radial flange 22 is molded between the cylindrical body and the first member 12. The radial flange 22 may be omitted depending on assembly method of application. The radial flange 22 has a diameter greater than the outer diameters of the cylindrical body 16 and first member 12.

The second end 20 has a spherical member 24 integrally attached thereto. The spherical member 24 extends longitudinally outwardly of the second end 20. The spherical member 24 has a outer diameter less than the diameter of the cylindrical body 16. The second end 20 of the cylindrical body further includes a surface 25 which tapers between the diameter of the cylindrical body 16 and a neck 28 on the sphere 24. The spherical member 24 includes a slot 26 longitudinally extending therethrough forming two semi-spherical portions 24a, 24b connected at the neck 28. The slot 26 allows the spherical members 24a, 24b to resilient flex toward one another from the neck 28.

The cylindrical body 16 also includes a pair of recesses 30, 32 extending from the second end 20 towards the first end 18 within its external surface 33. A first of the recesses 30 has an arcuate width greater than the arcuate width of the second recess 32. The recesses 30, 32 extend approximately ⅔ the longitudinal length of the cylindrical body 16. The recesses 30, 32 extend within the external surface 33 to a depth that forms a bridge 33 having a width corresponding to the diameter of the spherical member 24. The slot 26 is aligned with the recesses 30, 32.

A cylindrical sheath 40 is adapted to be fixedly secured to the second member 14. The cylindrical sheath 40 has a longitudinal length aligned with the longitudinal length of the cylindrical body 16. The sheath 40 includes a cylindrical bore 42 formed therethrough for the longitudinal length. The diameter of the bore 42 is slightly greater than the diameter of the cylindrical body 16 to allow insertion thereof within the bore 42. The sheath 40 includes a pair of longitudinally extending ribs 44, 46 radially extending into the bore 42 for aligning with the recess 30, 32 of the cylindrical body 16. A first of the ribs 44 includes a arcuate width greater than the arcuate width the second rib 46. The radial width of the ribs 44, 46 complement the radial width of the recesses 30, 32 for insertion therein.

Figure 7:
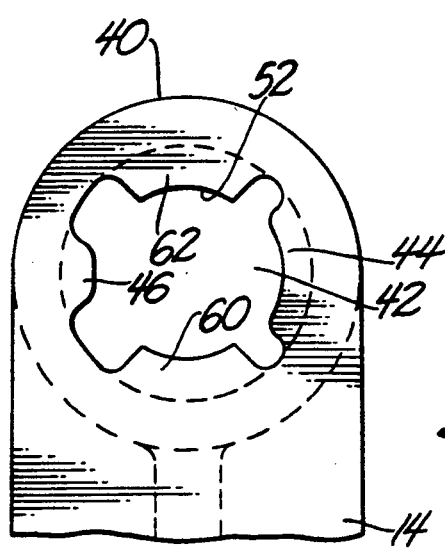
FIG. 7 is an end view of the cylindrical sheath taken along lines 7—7 of FIG. 5.

The bore 42 has an opening 50, 52, respectively, at first and second ends 54, 56 of the cylindrical sheath 40. The first end 54 is initially aligned with the cylindrical body 16 and the opening 50 has a constant diameter slightly greater or equal to the outer diameter of the cylindrical body 16. At a position approximately one-fourth of the longitudinal length from the first end 54, the pair of ribs 44, 46 project radially into the bore 42 as best seen in FIG. 7. The ribs 44, 46 extend from a first rib end 58 to a second rib end 59 at the second end 56 of the bore 42. At the second end 59, a pair of flanges 60, 62 extend into the second aperture 56 a distance greater than the ribs 44, 46 thereby providing a second aperture 56 of a diameter less than the diameter of the spherical member 24. The flanges 60, 62 are graduated to the second end 56 providing lead-in to the second aperture 56.

The pair of ribs 44, 46 include arcuate widths at the first rib end 58 slightly less than the widths of the respective recesses 30, 32, and taper to an enlarged width at the second rib end 59. The widths of the ribs 44, 46 at the second rib end 59 is slightly greater than the widths of the respective recesses 30, 32 to provide a frictional clamping effect therewith upon full insertion of the body 16 into the sheath 40.

For assembly, the cylindrical body 16 is inserted within the cylindrical sheath 40 by directing the spherical member 24 into the first end 54 of the sheath 40. The recesses 30, 32 must be aligned properly with the respective ribs 44, 46 for continued insertion of the cylindrical body 16 within the cylindrical sheath 40. In order to allow full insertion, the resilient spherical member 24 is slightly clamped together provided by the lead-in of the spherical member 24 by the flanges 60, 62. When fully inserted, stop surfaces 66 are provided by the bottom of the recesses 30, 32 wherein the first end 58 or each rib 44 and 46 abuts against the bottom of the recesses 30, 32. Furthermore, the flange 22 abuts against the first end 54 of the sheath 40. The spherical member 24 re-expands once extending out of the sheath 40 from the second end 56 with the cylindrical body 16 fully inserted within the sheath 40. The cylindrical body 16 is retained within the sheath 40 by the spherical member 24 extending from the sheath 40 and with the tapered ribs 44, 46 frictionally secured within the recesses 30, 32.

It should be understood that the cylindrical body 16 has substantially the same cross-sectional area as the first member 12 so as to have the same strength properties. The cylindrical sheath 40 is of greater diameter than the cylindrical body 16 and thereby has somewhat greater strength properties. Therefore, the modulus of the material for the cylindrical sheath 40 can be less than that of the body 16 allowing selection of the lower grade material for the sheath 40. Typical material utilized for molding of the cylindrical member 6 is made of plastic or metal or wood; and for the sheath 40 is plastic or wood. The surface of the flexible semi-spherical portions 24a, 24b combined with the slot 26 provides retention between the sphere 24 and the end 56 where the sphere 24 is snapped outwardly of the sheath 40 as shown in FIG. 1. The size, shape and depth of the slot 26 determines the amount of retention capacity against axial separation of the first and second members 12, 14. The sheath 40 remains connected to the cylindrical body 16 even if one flexible semi-spherical portion 24a, 24b breaks off.

By virtue of the aforedescribed structure, the fastener assembly 10 has enhanced resistance to fracture and breakage. Further the fastener assembly 10 provides an anti-rotational and insertion retention fastener for use in members that are longitudinally aligned with one another.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

I claim:

1. A fastener assembly for securing a first member to a second member, said assembly comprising:
    a cylindrical body adapted to be fixedly secured to the first member having a longitudinal length extending between first and second ends, and including an external surface and a recess extending longitudinally within said external surface from said second end toward said first end, said second end including a spherical member extending longitudinally outwardly therefrom having a slot therethrough forming two portions connected to said second end, and
    a sheath adapted to be fixedly secured to the second member having an outer surface and including a cylindrical bore formed longitudinally therethrough with a rib extending therein for receiving said cylindrical body within said bore said recess alignable with said rib for arcuate orientation between said cylindrical body and said sheath and said spherical member engageable with said outer surface for retaining said cylindrical body within said sheath to prevent rotation therebetween.

2. A fastener assembly for securing a first member to a second member, said assembly comprising:
    a cylindrical body adapted to be fixedly secured to the first member having a longitudinal length extending between first and second ends, and including an external surface and a recess extending longitudinally within said external surface from said second end toward said first end, said second end including a spherical member extending longitudinally outwardly therefrom having a slot therethrough forming two portions connected to said second end, and
    a sheath adapted to be fixedly secured to the second member having an outer surface and including a cylindrical bore formed longitudinally therethrough with a rib extending therein for receiving said cylindrical body within said bore, said recess alignable with said rib for arcuate orientation between said cylindrical body and said sheath; said spherical member engageable with said outer surface for retaining said cylindrical body within said sheath to prevent rotation therebetween;

said rib including an enlarged end tapering to a smaller end for tightening against said recess upon insertion of said cylindrical body within said sheath.

3. A fastener assembly for securing a first member to a second member, said assembly comprising:
 a cylindrical body adapted to be fixedly secured to the first member having a longitudinal length extending between first and second ends, and including an external surface and a recess extending longitudinally within said external surface from said second end toward said first end, said second end including a spherical member extending longitudinally outwardly therefrom having a slot therethrough forming two portions connected to said second end, and
 a sheath adapted to be fixedly secured to the second member having an outer surface and including a cylindrical bore formed longitudinally therethrough with a rib extending therein for receiving said cylindrical body within said bore said recess alignable with said rib for arcuate orientation between said cylindrical body and said sheath and with said spherical member engageable with said outer surface for retaining said cylindrical body within said sheath to prevent rotation therebetween;

said rib including an enlarged end tapering to a smaller end for tightening against said recess upon insertion of said cylindrical body within said sheath;

said cylindrical body including a pair of recesses diametrically opposed, and said sheath including a pair of diametrically opposed ribs alignable with said recesses, a first of said alignable recesses and ribs having an arcuate width greater than an arcuate width of a second of said alignable recesses and ribs for arcuate orientation of said cylindrical body within said sheath.

* * * * *